US012749612B2

(12) United States Patent
Oh

(10) Patent No.: US 12,749,612 B2
(45) Date of Patent: Sep. 29, 2026

(54) COIL COMPONENT

(71) Applicant: SAMSUNG ELECTRO-MECHANICS CO., LTD., Suwon-si (KR)

(72) Inventor: Jun Seok Oh, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 1118 days.

(21) Appl. No.: 17/748,208

(22) Filed: May 19, 2022

(65) Prior Publication Data

US 2023/0154668 A1 May 18, 2023

(30) Foreign Application Priority Data

Nov. 12, 2021 (KR) ........................ 10-2021-0155603

(51) Int. Cl.
*H01F 27/29* (2006.01)
*H01F 17/04* (2006.01)
(Continued)

(52) U.S. Cl.
CPC ......... *H01F 27/292* (2013.01); *H01F 17/045* (2013.01); *H01F 27/2828* (2013.01); *H01F 27/324* (2013.01); *H01F 2017/048* (2013.01)

(58) Field of Classification Search
CPC .. H01F 27/292; H01F 17/045; H01F 27/2828; H01F 27/324; H01F 2017/048
See application file for complete search history.

(56) References Cited

U.S. PATENT DOCUMENTS

2016/0189863 A1* 6/2016 Park ........................ H01F 17/04 29/602.1
2016/0372255 A1 12/2016 Maki et al.
(Continued)

FOREIGN PATENT DOCUMENTS

JP 2002-289463 A 10/2002
JP 2016-122836 A 7/2016
(Continued)

OTHER PUBLICATIONS

Office Action issued on Dec. 18, 2025 in corresponding Korean Patent Application No. 10-2021-0155603 with English translation.
(Continued)

*Primary Examiner* — Malcolm Barnes
(74) *Attorney, Agent, or Firm* — Morgan, Lewis & Bockius LLP

(57) ABSTRACT

A coil component includes: a body including magnetic metal particles and an insulating resin; a coil portion disposed within the body and including a lead-out portion exposed to one surface of the body; a surface insulation layer disposed on the body and having an opening exposing each of at least a portion of the lead-out portion and at least a portion of the one surface of the body; and an external electrode disposed in the opening and connected to the lead-out portion, wherein a connection metal layer in which at least some of the magnetic metal particles are connected to each other is disposed in a region of the one surface of the body, exposed in the opening, and an area of a metal component including the connection metal layer in the region is 75% or more of an area of the region.

15 Claims, 11 Drawing Sheets

'B'

(51) Int. Cl.
*H01F 27/28* (2006.01)
*H01F 27/32* (2006.01)

(56) References Cited

U.S. PATENT DOCUMENTS

| | | | | |
|---|---|---|---|---|
| 2017/0178793 | A1* | 6/2017 | Muneuchi | H01F 41/076 |
| 2018/0033540 | A1* | 2/2018 | Lee | H01F 41/041 |
| 2018/0144859 | A1* | 5/2018 | Araki | H01F 27/292 |
| 2018/0247747 | A1* | 8/2018 | Tomohiro | H01F 1/20 |
| 2019/0019615 | A1* | 1/2019 | Lee | H01F 27/255 |
| 2019/0362883 | A1* | 11/2019 | Kang | H01F 27/2804 |
| 2019/0392987 | A1* | 12/2019 | Sheng | B22F 3/24 |
| 2020/0168391 | A1 | 5/2020 | Yang et al. | |
| 2020/0335253 | A1* | 10/2020 | Yeo | H01F 41/122 |
| 2021/0043363 | A1* | 2/2021 | Ooi | H01F 27/2852 |
| 2021/0043366 | A1* | 2/2021 | Ooi | H01F 17/045 |
| 2021/0098183 | A1* | 4/2021 | Araki | H01F 41/127 |
| 2021/0313106 | A1* | 10/2021 | Noumi | H01F 27/292 |
| 2022/0115177 | A1* | 4/2022 | Tonogai | H01F 17/04 |
| 2022/0262563 | A1* | 8/2022 | Arai | H01F 1/26 |

FOREIGN PATENT DOCUMENTS

| | | | |
|---|---|---|---|
| JP | 2017-011256 | A | 1/2017 |
| JP | 2018-085459 | A | 5/2018 |
| JP | 2021-027203 | A | 2/2021 |
| KR | 10-2017-0002359 | A | 1/2017 |
| KR | 10-2018-0012178 | A | 2/2018 |
| KR | 10-2093147 | B1 | 3/2020 |
| WO | 2017/135057 | A1 | 8/2017 |

OTHER PUBLICATIONS

Office Action issued on Mar. 10, 2026 in corresponding Japanese Patent Application No. 2022-088530 with English translation.

Office Action dated Jul. 28, 2026 issued in the corresponding Korean Patent Application No. 10-2021-0155603 with English translation.

* cited by examiner

COIL COMPONENT

CROSS-REFERENCE TO RELATED APPLICATION(S)

This application claims benefit of priority to Korean Patent Application No. 10-2021-0155603 filed on Nov. 12, 2021 in the Korean Intellectual Property Office, the disclosure of which is incorporated herein by reference in its entirety.

BACKGROUND

1. Field

The present disclosure relates to a coil component.

2. Description of Related Art

An inductor, a coil component, is a representative passive electronic component used in an electronic device together with a resistor and a capacitor.

The coil component may generally be completed as a component by forming a body in which a coil portion is disposed, and forming an external electrode on a surface of the body. In this case, problems may occur in a coupling force between the body and the external electrode, and in contact resistance between the external electrode and the coil portion.

SUMMARY

An aspect of the present disclosure may provide a coil component having increased coupling force between a body and an external electrode.

Another aspect of the present disclosure may provide a coil component without reduction of break down voltage (BDV).

According to an aspect of the present disclosure, a coil component includes a body including magnetic metal particles and an insulating resin, a coil portion disposed within the body and including a lead-out portion exposed to one surface of the body, a surface insulation layer disposed on the body and having an opening exposing each of at least a portion of the lead-out portion and at least a portion of the one surface of the body, and an external electrode disposed in the opening and connected to the lead-out portion, wherein a connection metal layer in which at least some of the magnetic metal particles are connected to each other is disposed in a region of the one surface of the body, exposed in the opening, and an area of a metal component including the connection metal layer in the region is 75% or more of an area of the region.

BRIEF DESCRIPTION OF DRAWINGS

The above and other aspects, features and advantages of the present disclosure will be more clearly understood from the following detailed description taken in conjunction with the accompanying drawings, in which.

DETAILED DESCRIPTION

Figure 1:
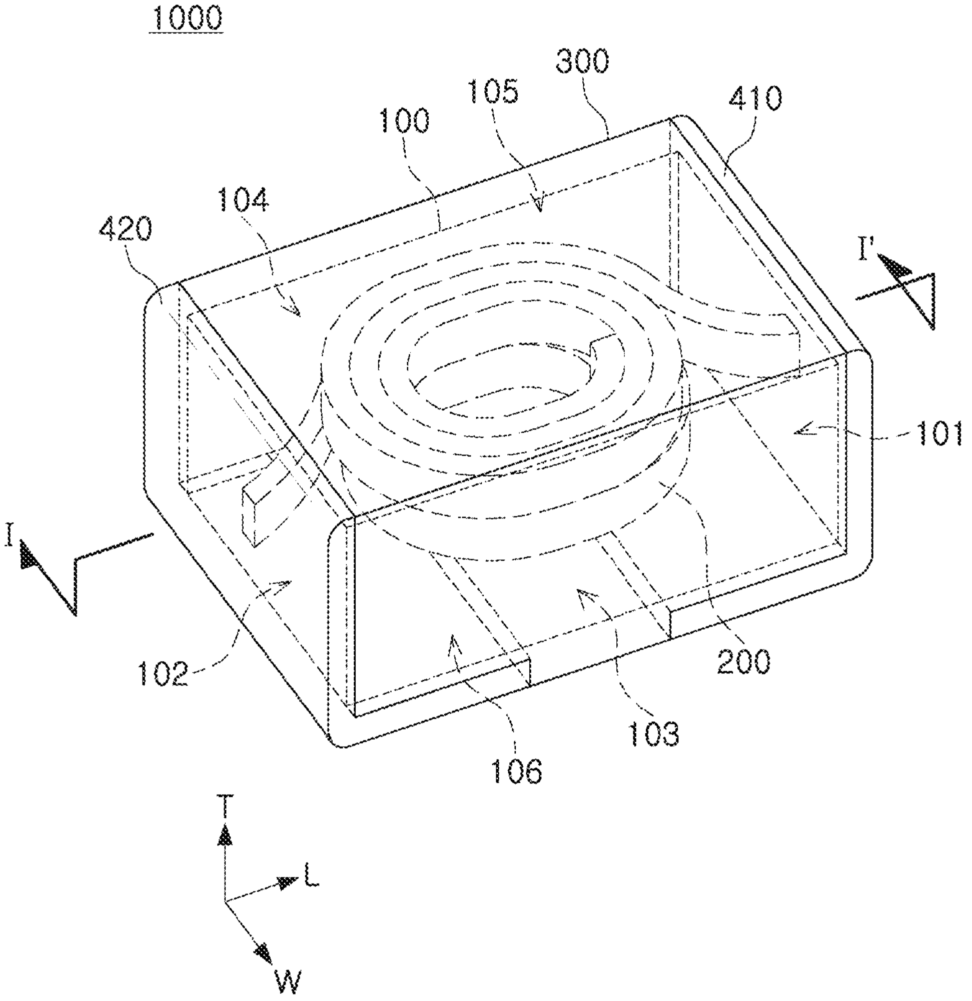
FIG. 1 is a perspective view schematically illustrating a coil component according to an exemplary embodiment of the present disclosure.

Hereinafter, exemplary embodiments in the present disclosure will now be described in detail with reference to the accompanying drawings.

In the drawings, an L direction refers to a first direction or a length direction, a W direction refers to a second direction or a width direction, and a T direction refers to a third direction or a thickness direction.

Hereinafter, a coil component according to exemplary embodiments of the present disclosure will be described in detail with reference to the accompanying drawings. In describing exemplary embodiments of the present disclosure with reference to the accompanying drawings, components that are the same as or correspond to each other will be denoted by the same reference numerals, and overlapping descriptions thereof will be omitted.

Various kinds of electronic components may be used in an electronic device, and various kinds of coil components may be appropriately used between these electronic components depending on their purposes in order to remove noise or the like.

That is, the coil component used in the electronic device may be a power inductor, high frequency (HF) inductor, a general bead, a bead for a high frequency (GHz), a common mode filter or the like.

Figure 2:
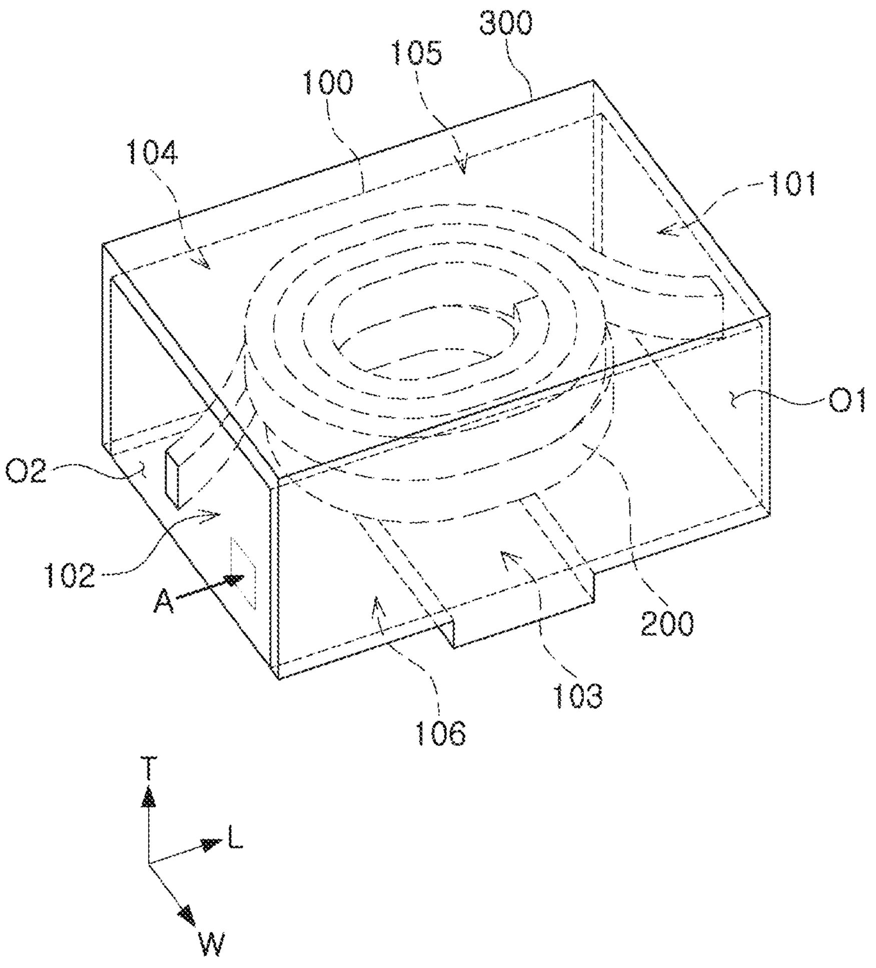
FIG. 2 is a view schematically illustrating that some components are removed from the coil component of FIG. 1.
Figure 3:
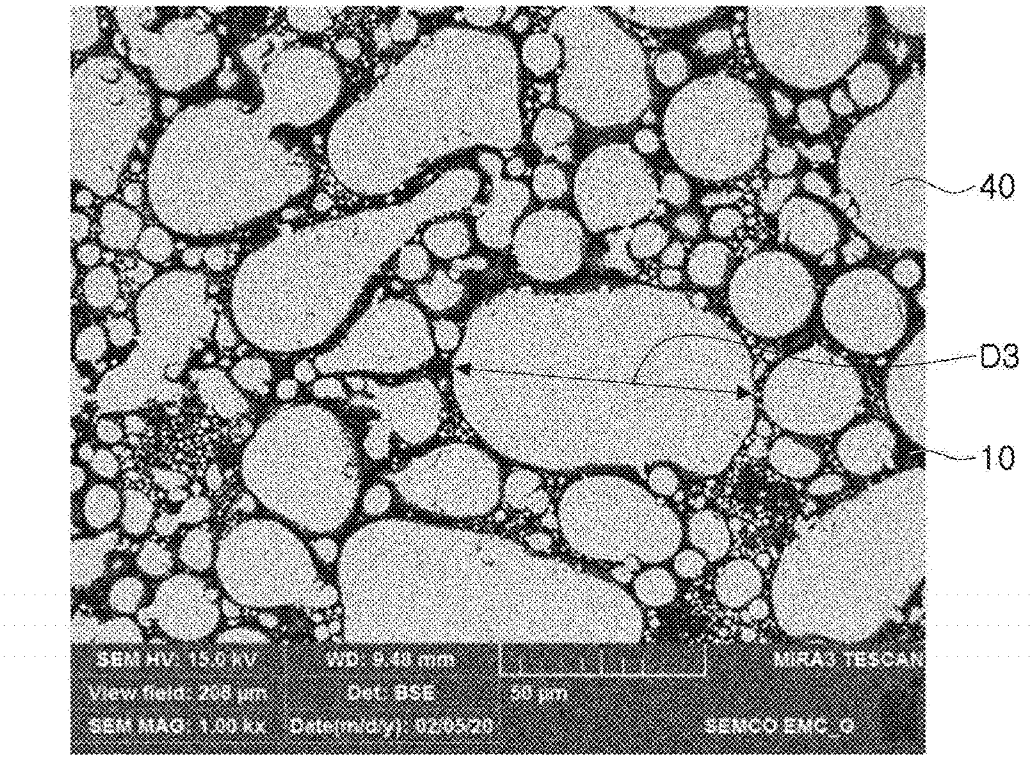
FIG. 3 is a view schematically illustrating a scanning electron microscope (SEM) image of a portion of a surface of a body based on a direction A of FIG. 2.
Figure 4:
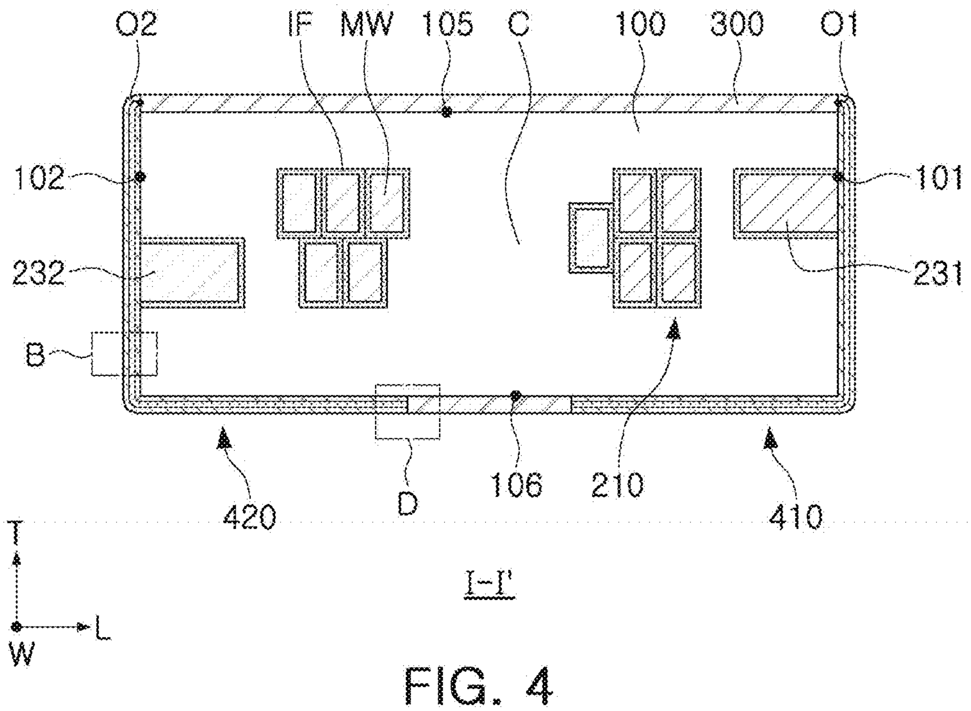
FIG. 4 is a view schematically illustrating a cross section of the coil component, taken along line I-I' of FIG. 1.
Figure 5:
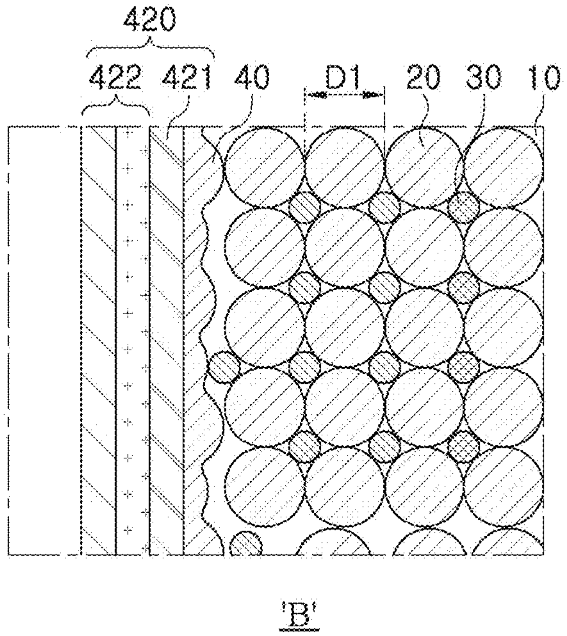
FIG. 5 is an enlarged view schematically illustrating a region B of FIG. 4.
Figure 6:
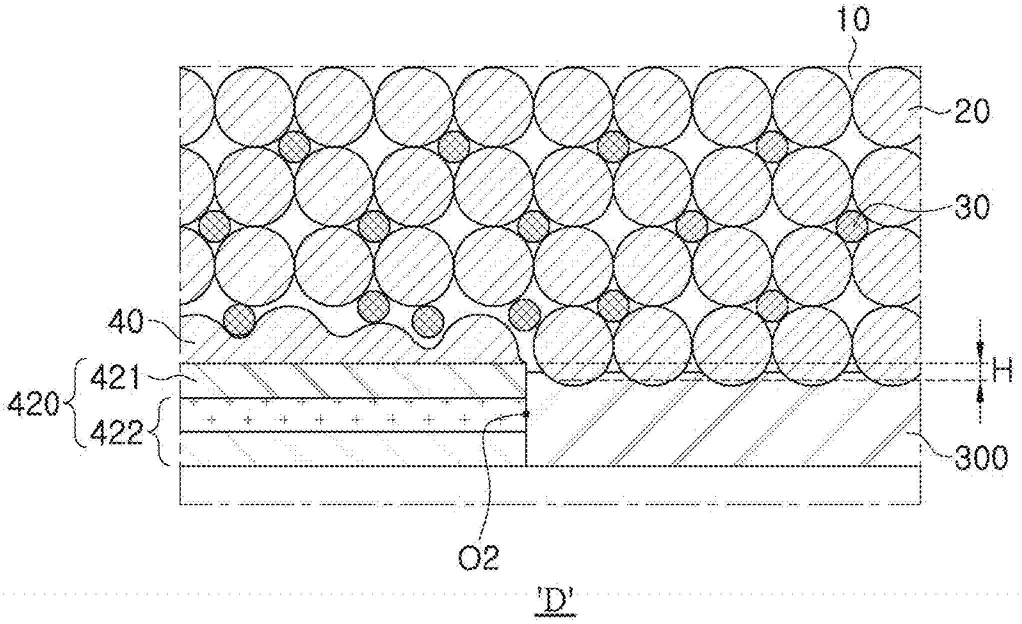
FIG. 6 is an enlarged view schematically illustrating a region D of FIG. 4.

FIG. 1 is a perspective view schematically illustrating a coil component according to an exemplary embodiment of the present disclosure. FIG. 2 is a view schematically illustrating that some components are removed from the coil component of FIG. 1. FIG. 3 is a view schematically illustrating a scanning electron microscope (SEM) image of a portion of a surface of a body based on a direction A of FIG. 2. FIG. 4 is a view schematically illustrating a cross section of the coil component, taken along line I-I' of FIG. 1. FIG. 5 is an enlarged view schematically illustrating a region B of FIG. 4. FIG. 6 is an enlarged view schematically illustrating a region D of FIG. 4.

Referring to FIGS. 1, 2 and 4, a coil component 1000 according to an exemplary embodiment of the present disclosure may include a body 100, a coil portion 200, a surface insulation layer 300 and external electrodes 410 and 420.

The body 100 may form an appearance of the coil component 1000 according to this exemplary embodiment, and may embed the coil portion 200 therein.

The body 100 may generally have a hexahedral shape.

The body 100 may have a first surface 101 and a second surface 102 opposing each other in the length (L) direction, a third surface 103 and a fourth surface 104 opposing each other in the width (W) direction, and a fifth surface 105 and a sixth surface 106 opposing each other in the thickness (T) direction, as shown in FIGS. 1 and 2. Each of the first to fourth surfaces 101, 102, 103 and 104 of the body 100 may connect the fifth surface 105 and the sixth surface 106 of the body 100 to each other. The sixth surface 106 of the body 100 may be used as a mounting surface when the coil component 1000 according to this exemplary embodiment is mounted on a mounting board such as a printed circuit board (PCB).

The body 100 of the coil component 1000 including the external electrodes 410 and 420 described below according to this exemplary embodiment, may have, for example, a length of 2.5 mm, a width of 2.0 mm and a thickness of 1.0 mm, a length of 1.6 mm, a width of 0.8 mm and a thickness of 0.8 mm, a length of 1.0 mm, a width of 0.5 mm and a thickness of 0.5 mm or a length of 0.8 mm, a width of 0.4 mm and a thickness of 0.65 mm. However, the present disclosure is not limited thereto. Meanwhile, the above exemplary numerical values for the length, width, and thickness of the coil component 1000 may be numerical values that do not reflect process errors, and a range of the numerical values recognized to include the process errors may thus fall within that of the above-described exemplary numerical values.

The above length of the coil component 1000 may have a maximum value of respective dimensions of a plurality of line segments connecting two outermost boundary lines of the coil component 1000 shown in a cross-sectional image, opposing each other, in the length (L) direction to each other to be parallel to the length (L) direction, and spaced apart from each other in the thickness (T) direction, in which the cross-sectional image is an image of a length-thickness (LT) cross section of the coil component 1000 based on its center in the width (W) direction, obtained by using an optical microscope or a scanning electron microscope (SEM). Alternatively, the length of the coil component 1000 may have a minimum value of the respective dimensions of the plurality of line segments described above. Alternatively, the length of the coil component 1000 may have at least three arithmetic average values of the respective dimensions of the plurality of line segments described above. Here, the plurality of line segments parallel to the length (L) direction may be equally spaced from each other in the thickness (T) direction, and a scope of the present disclosure is not limited thereto.

The above thickness of the coil component 1000 may have a maximum value of respective dimensions of a plurality of line segments connecting two outermost boundary lines of the coil component 1000 shown in the cross-sectional image, opposing each other, in the thickness (T) direction to each other to be parallel to the thickness (T) direction, and spaced apart from each other in the length (L) direction, in which the cross-sectional image is the image of the length-thickness (LT) cross section of the coil component 1000 based on its center in the width (W) direction, obtained by using the optical microscope or the scanning electron microscope (SEM). Alternatively, the thickness of the coil component 1000 may refer to a minimum value of the respective dimensions of the plurality of line segments described above. Alternatively, the thickness of the coil component 1000 may have at least three arithmetic average values of the respective dimensions of the plurality of line segments described above. Here, the plurality of line segments parallel to the thickness (T) direction may be equally spaced from each other in the length (L) direction, and the scope of the present disclosure is not limited thereto.

The above width of the coil component 1000 may have a maximum value of respective dimensions of a plurality of line segments connecting two outermost boundary lines of the coil component 1000 shown in the cross-sectional image, opposing each other, in the width (W) direction to each other to be parallel to the width (W) direction, and spaced apart from each other in the length (L) direction, in which the cross-sectional image is the image of the length-thickness (LT) cross section of the coil component 1000 based on its center in the width (W) direction, obtained by using the optical microscope or the scanning electron microscope (SEM). Alternatively, the width of the coil component 1000 may refer to a minimum value of the respective dimensions of the plurality of line segments described above. Alternatively, the width of the coil component 1000 may have at least three arithmetic average values of the respective dimensions of the plurality of line segments described above. Here, the plurality of line segments parallel to the width (W) direction may be equally spaced from each other in the length (L) direction, and the scope of the present disclosure is not limited thereto.

Alternatively, each of the length, width and thickness of the coil component 1000 may be measured by using a micrometer measurement method. The micrometer measurement method may be used by setting a zero point with a micrometer using a repeatability and reproducibility (Gage R&R), inserting the coil component 1000 according to this exemplary embodiment between tips of the micrometer, and turning a measurement lever of the micrometer. Meanwhile, when measuring the length of the coil component 1000 by using the micrometer measurement method, the length of the coil component 1000 may indicate a value measured once or an arithmetic average of values measured several times. This manner may be equally applied to the width and thickness of the coil component 1000.

The body 100 may have a core C passing through a center of the coil portion 200 described below. When the body 100 is formed by stacking at least one magnetic composite sheet including magnetic metal powder particles and an insulating resin on the upper and lower portions of the coil portion 200, the core C may be formed by filling a through-hole formed in the center of the coil portion 200 by the magnetic composite sheet, and is not limited thereto.

The body 100 may include an insulating resin 10 and magnetic metal particles 20 and 30. In detail, the body 100 may be formed by stacking one or more magnetic composite sheets each including the insulating resin and the magnetic material powder particles dispersed in the insulating resin. The magnetic metal powder particles of the magnetic composite sheet may become the magnetic metal particles 20 and 30 of the body 100 in a subsequent process.

The magnetic metal particles 20 and 30 may each include one or more selected from the group consisting of iron (Fe), silicon (Si), chromium (Cr), cobalt (Co), molybdenum (Mo), aluminum (Al), niobium (Nb), copper (Cu), boron (B) and nickel (Ni). For example, the magnetic metal particles 20 and 30 may each be formed by using one or more of pure iron powder particles, Fe—Si-based alloy powder particles, Fe—Si—Al-based alloy powder particles, Fe—Ni-based alloy powder particles, Fe—Ni—Mo-based alloy powder particles, Fe—Ni—Mo—Cu-based alloy powder particles, Fe—Co-based alloy powder particles, Fe—Ni—Co-based alloy powder particles, Fe—Cr-based alloy powder particles, Fe—Cr—Si-based alloy powder particles, Fe—Si—Cu—Nb-based alloy powder particles, Fe—Ni—Cr-based alloy powder particles or Fe—Cr—Al-based alloy powder particles.

The magnetic metal particles 20 and 30 may each be amorphous or crystalline. For example, the magnetic metal particles 20 and 30 may include Fe—Si based amorphous alloy powder particles, and are not necessarily limited thereto. The magnetic metal particles 20 and 30 may each have an average diameter of about 0.1 μm to 30 μm, and are not limited thereto.

The magnetic metal particles may include a first magnetic metal particle 20 and a second magnetic metal particle 30 having a diameter smaller than that of the first magnetic metal particle 20. In the present specification, the diameter may refer to a particle-size distribution indicated by $D_{90}$ or $D_{50}$. In the present disclosure, the magnetic metal particles 20 and 30 may include the first magnetic metal particle 20 and the second magnetic metal particle 30 having a smaller diameter than the first magnetic metal particle 20, and the second magnetic metal particles 30 may thus be disposed in a space between the first magnetic metal particles 20, thereby improving a filling rate of the magnetic material particles in the body 100.

The insulating resin 10 may include epoxy, polyimide, liquid crystal polymer (LCP) or the like or a mixture thereof, and is not limited thereto.

The coil portion 200 may be disposed within the body 100 and exhibit a characteristic of the coil component. For example, when the coil component 1000 of this exemplary embodiment is used as the power inductor, the coil portion 200 may serve to store an electric field as a magnetic field to maintain an output voltage, thereby stabilizing power of the electronic device.

The coil portion 200 may be a wound type coil formed by winding a wire rod including a metal wire (MW) such as a copper wire and an insulating film (IF) covering a surface of the metal wire MW in a spiral shape.

The coil portion 200 may include a wound portion 210 having at least one turn formed by using the core C as an axis, and lead-out portions 231 and 232 respectively extended from both ends of the wound portion 210 and respectively exposed to the first and second surfaces of the body 100. The first lead-out portion 231 may be extended from one end of the wound portion 210 to be exposed to the first surface 101 of the body 100, and the second lead-out portion 232 may be extended from the other end of the wound portion 210 to be exposed to the second surface 102 of the body 100. Meanwhile, the first and second lead-out portions 231 and 232 respectively exposed to the first and second surfaces 101 and 102 of the body 100 may also correspond to the first and second surfaces 101 and 102 included in the body 100. However, in the present specification, for convenience of description, the surfaces to which the first and second lead-out portions 231 and 232 are exposed and the first and second surfaces 101 and 102 of the body 100 are distinguished from each other.

The wound portion 210 may be formed by winding the above-described wire rod in the spiral shape. As a result, all surfaces (corresponding to a total of four line segments respectively corresponding to the upper surface, lower surface, and two opposite side surfaces of each turn in the L direction, based on the L-T cross section of FIG. 4) of each turn of the wound portion 210 may be covered by the insulating film IF, based on a cross section (e.g., L-T cross section as shown in FIG. 4) of the component. The wound portion 210 may include at least one layer. Each layer of the wound portion 210 may have a flat spiral shape, and may have at least one turn.

The lead-out portions 231 and 232 may be integrally formed with the wound portion 210. For example, the wound portion 210 may be formed by winding the above-described wire rod, and regions of the wire rod extended from the wound portion 210 may be the lead-out portions 231 and 232.

The metal wire (MW) may include a conductive material such as copper (Cu), aluminum (Al), silver (Ag), tin (Sn), gold (Au), nickel (Ni), lead (Pb), titanium (Ti), Chromium (Cr), Molybdenum (Mo) or an alloy thereof, and is not limited thereto.

The insulating film (IF) may include an insulating material such as enamel, parylene, epoxy or polyimide. The insulating film (IF) may be formed of two or more layers. For example, the insulating film (IF) may include a covering layer in contact with the metal wire (MW), and a fusion layer formed on the covering layer, and is not limited thereto. After winding the metal wire (MW), which is the wire rod, in a coil shape, the fusion layer may be coupled to the fusion layer of the metal wire (MW) of the adjacent turn to each other by heat and pressure. When winding the metal wire (MW) including the insulating film (IF) having such a structure, the fusion layers of the plurality of turns of the wound portion 210 may be fused to each other and integrated with each other. Meanwhile, FIGS. 1 and 2 show an alpha-type wound coil as the coil portion 200 of this exemplary embodiment. However, the scope of this exemplary embodiment is not limited thereto, and an edge-wise type wound coil may also be the coil portion 200 of this exemplary embodiment.

The surface insulation layer 300 may be disposed on the surface of the body 100. The surface insulation layer 300 may include an opening O1 or O2 exposing each of at least a portion of the lead-out portion 231 or 232 and at least a portion of the first or second surface 101 or 102 of the body, respectively. In detail, in this exemplary embodiment, the surface insulation layer 300 may be disposed on the first to sixth surfaces 101, 102, 103, 104, 105 and 106 of the body 100, and may include the first opening O1 exposing the first surface 101 of the body 100 and the second opening O2 exposing the second surface 102 of the body 100. In addition, in this exemplary embodiment, the first opening O1 exposing the first surface 101 of the body 100 may be extended to expose at least a portion of the sixth surface 106 of the body 100, and the second opening O2 exposing the second surface 102 of the body 100 may be extended to expose at least a portion of the sixth surface 106 of the body 100. The first and second openings O1 and O2 may be spaced apart from each other in the sixth surface 106 of the body 100. That is, in this exemplary embodiment, the openings O1 and O2 may each have an L-shaped cross section to expose any one of the first and second surfaces 101 and 102 of the body 100 and a portion of the sixth surface 106 of the body 100 together. The first and second lead-out portions 231 and 232 of the coil portion 200 may also be exposed in the openings O1 and O2 of the surface insulation layer 300, respectively. Meanwhile, an expression that some elements (e.g., first and second surfaces 101 and 102 of the body 100, and first and second lead-out portions 231 and 232) of this exemplary embodiment may be exposed in the openings O1 and O2, may only indicate that some elements are not covered by the surface insulation layer 300. It does not indicate that some elements are exposed to the outside, based on an appearance of a final product including other elements such as the external electrodes 410 and 420 described below.

For example, the opening O1 or O2 may be formed by forming the surface insulation layer 300 to cover all of the first to sixth surfaces 101, 102, 103, 104, 105 and 106 of the body 100 and then selectively removing a portion of the surface insulation layer, disposed on the first or second surface 101 or 102 of the body 100. The above-described selective removal of the surface insulation layer 300 may be performed, for example, in a laser irradiation process. The external electrode 410 or 420 described below may be disposed in the opening O1 or O2.

A connection metal layer may be disposed in the opening O1 or O2, and may include a connection metal layer particle 40 in which at least some of the first and second magnetic metal particles 20 and 30 are connected to each other.

The insulating resin 10 and the magnetic metal particles 20 and 30 may be elements included in the body 100, and may not only be included in the first to sixth surfaces 101, 102, 103, 104, 105 and 106, which are outlines of the body 100, but also be included in the inside of body 100, divided by the outlines of the body 100. Accordingly, the magnetic metal particles 20 and 30 may become one element included in each of the first to sixth surfaces 101, 102, 103, 104, 105 and 106 of the body 100. Meanwhile, the openings O1 and O2 may expose some of the first to sixth surfaces 101, 102, 103, 104, 105 and 106 of the body 100, and the first and second magnetic metal particles 20 and 30 included in the first to sixth surfaces 101, 102, 103, 104, 105 and 106 may thus be exposed in the openings O1 and O2. In this case, in the connection metal layer 40, the connection metal layer particle may be formed for example when at least some of the first and second magnetic metal particles 20 and 30 are melted by thermal energy of a laser and integrated and connected to each other in the laser process for forming the above-described openings O1 and O2. Accordingly, in the connection metal layer 40, the connection metal layer particle may be disposed only on a portion of each of the first to sixth surfaces 101, 102, 103, 104, 105 and 106 of the body 100, exposed in the openings O1 and O2. Meanwhile, for the above reasons, the first and second magnetic metal particles 20 and 30 as well as the connection metal layer particles may be exposed to some regions of the first to sixth surfaces 101, 102, 103, 104, 105 and 106 of the body 100, exposed in the openings O1 and O2.

A diameter D3 of the connection metal layer particle in the connection metal layer 40 may be twice or more than a diameter D1 of the first magnetic metal particle 20. As described above, the connection metal layer 40 may be formed by melting and connecting some of the magnetic metal particles 20 and 30 to each other in the laser process for forming the openings O1 and O2. Accordingly, the third particle of the connection metal layer particle 40 may be formed by melting and connecting the first magnetic metal particles 20 each having a larger diameter than the second magnetic metal particle 30 in the corresponding process. In addition, not only the surface insulation layer 300 but also at least a portion of the insulating resin 10 may be removed in the laser process for forming the openings O1 and O2, and the first and second magnetic metal particles 20 and 30, only spaced apart from each other or in contact with each other by the insulating resin 10, may thus be melted to each other and flow into a space from which the insulating resin 10 is removed. For this reason, the diameter D3 of the connection metal layer 40 may be twice or more than the diameter D1 of the first magnetic metal particle 20. In addition, for this reason, a region (H in FIG. 6) of the surface of the body 100, exposed to an opening O, may be disposed at a lower level than a region of the surface of the body 100, covered by the surface insulation layer 300. Here, an expression that the region of the surface of the body 100, exposed to the openings O1 and O2, may be disposed at the lower level than the region of the surface of the body 100, covered by the surface insulation layer 300, may indicate that an outline of the region of the surface of the body 100, exposed by the openings O1 and O2 may be disposed further inside the body 100 rather than an outline of the region of the surface of the body 100, covered by the surface insulation layer 300.

Meanwhile, FIG. 6 illustrates that the outline of the region of the sixth surface 106 of the body 100, which is exposed in the opening O2 and in which the connection metal layer 40 is disposed, is a straight line. However, this shape is only an example, and the scope of this exemplary embodiment is not limited thereto. That is, for example, the outline of the region of the sixth surface 106 of the body 100 in which the connection metal layer 40 is disposed may not be the straight line by melting and coupling the magnetic metal particles 20 and 30 to each other, removing the insulating resin 10 or the like in the laser process described above. In addition, for the above reasons, the region of the sixth surface 106 of the body 100, exposed in the opening O2, and the region of the sixth surface 106 of the body 100, covered by the surface insulation layer 300, may have different surface roughness. For example, the surface roughness of the region exposed in the opening O2 may be higher than the surface roughness of the region covered by the surface insulation layer 300.

The diameter D3 of the connection metal layer particles in the connection metal layer 40 may be measured using a scanning electron microscope (SEM) image of a region of the surface of the body 100, externally exposed, after removing the external electrodes 410 and 420 to be described below, which are respectively disposed in the openings O1 and O2. For example, the diameter D3 of the connection metal layer particles in the connection metal layer 40 may have a minimum value obtained by measuring all dimensions of a major axis of each connection metal layer particle in connection metal layer 40 shown in the corresponding image. Alternatively, the diameter of the connection metal layer particles in the connection metal layer 40 may have an arithmetic average value obtained by measuring all the dimensions of the major axis of each connection metal layer particles in the connection metal layer 40 shown in the corresponding image and then dividing a sum of these values by a total number of the connection metal layer particles in the connection metal layers 40 shown in the image. Alternatively, the diameter of the connection metal layer particles in the connection metal layer 40 may have a value corresponding to 50% of a value obtained by measuring all the dimensions of the major axis and minor axis of each connection metal layer particles in connection metal layer 40 shown in the corresponding image. Alternatively, the diameter of the connection metal layer particles in the connection metal layer 40 may have a value corresponding to 50% of a value obtained by measuring a diameter of each virtual circle assuming the circle having the same area as the area of each connection metal layer particles in connection metal layer 40.

An area of a metal component including the connection metal layer 40, may be 75% or more, 80% or more, 90% or more, or 95% or more of a total area of the some regions, based on some regions of the first to sixth surfaces 101, 102, 103, 104, 105 and 106 of the body 100, exposed in the openings O1 and O2. When the rate is less than 75%, the external electrodes 410 and 420 to be described below, formed in the openings O1 and O2, may be insufficiently formed, thereby reducing the bonding strength between the external electrodes 410 and 420 and a solder. In addition, when the rate is less than 75%, a breakdown voltage (BDV) may be reduced, thereby deteriorating a characteristic of the coil component. The area of the metal component, including the connection metal layer 40, and its rate may be controlled by, for example, adjusting an output of the laser, adjusting the number of shots of the laser, changing source of the laser or the like in the above-described laser process. Meanwhile, the rate may be measured based on only a region of the surface of the body 100, exposed in the opening O1 or O2, for example, a region of 208 μm*208 μm. In addition, for the above reasons, when calculating the rate, a denominator may not include the areas in which the first and second lead-out portions 231 and 232 are exposed. In addition, when calculating the rate, a molecule may also include areas in which the first and second magnetic metal particles 20 and 30 remaining without forming the connection metal layer 40 during the process are exposed.

The surface insulation layer 300 may function as a plating resist when forming first electrode layers 411 and 421 of the external electrodes 410 and 420 to be described below by plating, and is not limited thereto.

The surface insulation layer 300 may include a thermoplastic resin such as polystyrenes, vinyl acetates, polyesters, polyethylenes, polypropylenes, polyamides, rubbers or acryls, a thermosetting resin such as phenols, epoxies, urethanes, melamines or alkyds, a photosensitive resin, parylene, silicon oxide ($SiO_x$, wherein $0<x<2$) or silicon nitride ($SiN_x$, wherein $0<x<2$).

The surface insulation layer 300 may have an adhesive function. For example, when an insulating film may be stacked on the body 100 to form the surface insulation layer 300, the insulating film may be adhered to the surface of the body 100 by including an adhesive component. In this case, a separate adhesive layer may be formed on one surface of the surface insulation layer 300. However, when the surface insulation layer 300 is formed using the insulating film in a semi-cured state (or B-stage), the separate adhesive layer may not be formed on the one surface of the surface insulation layer 300.

The surface insulation layer 300 may be formed by applying a liquid insulating resin to the surface of the body 100, stacking the insulating film on the surface of the body 100 or forming the insulating resin on the surface of the body 100 by vapor deposition. When formed by using the insulating film, the surface insulation layer 300 may use a dry film (DF) including a photosensitive insulating resin, an Ajinomoto build-up film (ABF) not including the photosensitive insulating resin, a polyimide film or the like.

The surface insulation layer 300 may have a thickness in a range of 10 nm to 100 μm. When the surface insulation layer 300 has a thickness of less than 10 nm, the characteristic of the coil component may be reduced, such as a reduced Q factor, a reduced breakdown voltage or a reduced self-resonant frequency (SRF). When the surface insulation layer 300 has a thickness of more than 100 μm, the total length, width and thickness of the coil component may be increased, which is disadvantageous in making the coil component thinner.

The external electrodes 410 and 420 may respectively be disposed in the openings O1 and O2 to be connected to the lead-out portions 231 and 232. In detail, in this exemplary embodiment, the first opening O1 may be formed in the first surface 101 of the body 100 and extended to a portion of the sixth surface 106, and the first external electrode 410 may be disposed in the first opening O1, contact-connected to the first lead-out portion 231 of the coil portion 200, exposed to the first surface 101 of the body 100. The second opening O2 may be formed in the second surface 102 of the body 100 and extended to a portion of the sixth surface 106, and the second external electrode 420 may be disposed in the second opening O2 and contact-connected to the second lead-out portion 232 of the coil portion 200, exposed to the second surface 102 of the body 100. In addition, the first external electrode 410 may be contact-connected to the connection metal layer 40 disposed in the first opening O1, and the second external electrode 420 may be contact-connected to the connection metal layer 40 disposed in the second opening O2. The external electrodes 410 and 420 may be in contact not only with the lead-out portion 232 but also with the connection metal layer 40, thereby increasing the bonding strength between the external electrodes 410 and 420 and the solder.

The external electrodes 410 and 420 may respectively include the first electrode layers 411 and 421 respectively in contact with the connection metal layer 40 and lead-out portions 231 and 232, and second electrode layers 412 and 422 respectively disposed on the first electrode layers 411 and 421. The first electrode layers 411 and 421 may each be a plating layer made of copper (Cu). In this case, the surface insulation layer 300 may function as a plating resist in a plating process for forming the first electrode layers 411 and 421. Alternatively, the first electrode layers 411 and 421 may each be a conductive resin electrode formed by applying conductive powder particles each including at least one of copper (Cu) or silver (Ag) and a conductive paste including the insulating resin to the body 100 and then curing the same. The second electrode layers 412 and 422 may respectively be disposed on the first electrode layers 411 and 421, and may each include at least one of nickel (Ni) or tin (Sn). For example, the second electrode layer 412 or 422 may include a nickel (Ni) plating layer and a tin (Sn) plating layer sequentially plated on the first electrode layer 411 or 421, and the scope of the present disclosure is not limited thereto.

Table 1 below illustrates measurements of the bonding strength and the breakdown voltage (BDV) based on change in the rate of the area of the metal component, including the connection metal layer.

The rate of the area of the metal component, including the connection metal layer with respect to the area of the opening is measured by using the following method. First prepared are ten (10) component samples including the external electrodes for each of Examples 1 to 6 below. For each example, samples are immersed in a stripper reacting with the external electrode for a time of 30 seconds to 600 seconds to peel off the external electrode. Next obtained is the SEM image in a specific portion (e.g., 208 μm*208 μm) of a region of the surface of the body for each example, exposed by removing the external electrode, except for a portion where the lead-out portion is exposed. An insulating resin portion and a metal component portion are distinguished from each other in the image by using an object area tool, thereby obtaining the area of the metal component portion. The obtained area of the metal component is divided by a total area of the specific portion, and rates of these two areas are arithmetic-averaged for each example and indicated as an area rate in Table 1 below.

Next, the external electrode is formed again on the sample from which the external electrode is already removed by using the previous method, the solder is attached to an outer surface of the external electrode of the sample. After reflowing the solder, measured is an external force causing a fracture between the external electrode and the solder by applying the external force of 20N (20 kgf) or more at a rate of 0.5 mm/sec while sequentially increasing the external force. This result is obtained for each sample, and the arithmetic average for each example is indicated as the bonding strength in Table 1 below.

Next, the breakdown voltage (BDV) is measured by applying a voltage in units of 10V from 10V by using an impulse measurement instrument and measuring a voltage at a time point when a waveform failure occurs.

TABLE 1

| Example | Rate (%) of area | Bonding strength (N) | Breakdown voltage (BDV, V) |
|---|---|---|---|
| #1 | 26.8 | 32.9 | 145 |
| #2 | 38.7 | 31.8 | 144 |
| #3 | 46.3 | 33.7 | 143 |
| #4 | 66.7 | 33.4 | 134 |
| #5 | 75.1 | 38.5 | 142 |
| #6 | 83.2 | 40.9 | 138 |

Referring to Table 1, Examples 1 to 4 show that when the rate of the area is less than 75%, it is difficult to secure a bonding strength of 38N or more. On the other hand, Examples 5 and 6 having the rate of the area is 75% or more each show the bonding strength of 38N or more. In addition, referring to Table 1, it is confirmed that the breakdown voltage is at the same level regardless of the rate of the area. As a result, as shown in Table 1, each of Examples 5 and 6 illustrate that it is possible to secure the breakdown voltage at an appropriate level while securing the bonding strength at a certain level or more when the rate of the area is 75% or more.

Figure 7:
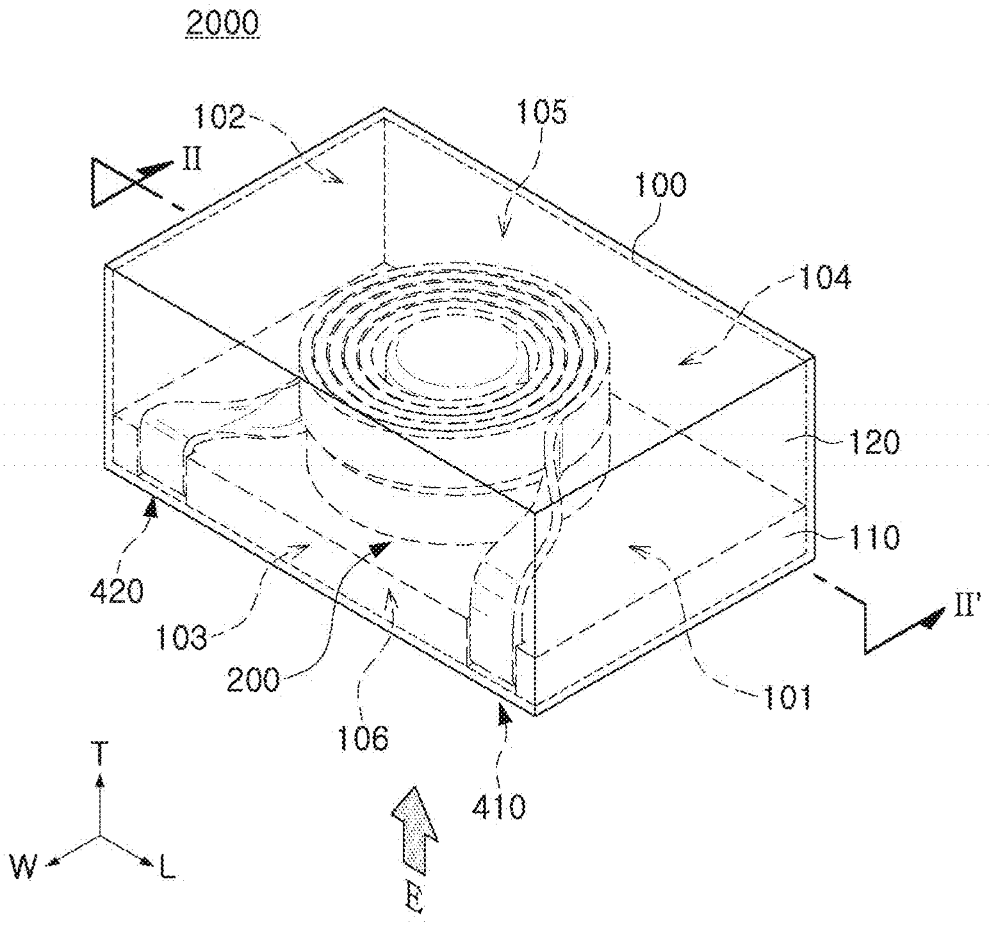
FIG. 7 is a view schematically illustrating a coil component according to another exemplary embodiment of the present disclosure.
Figure 8:
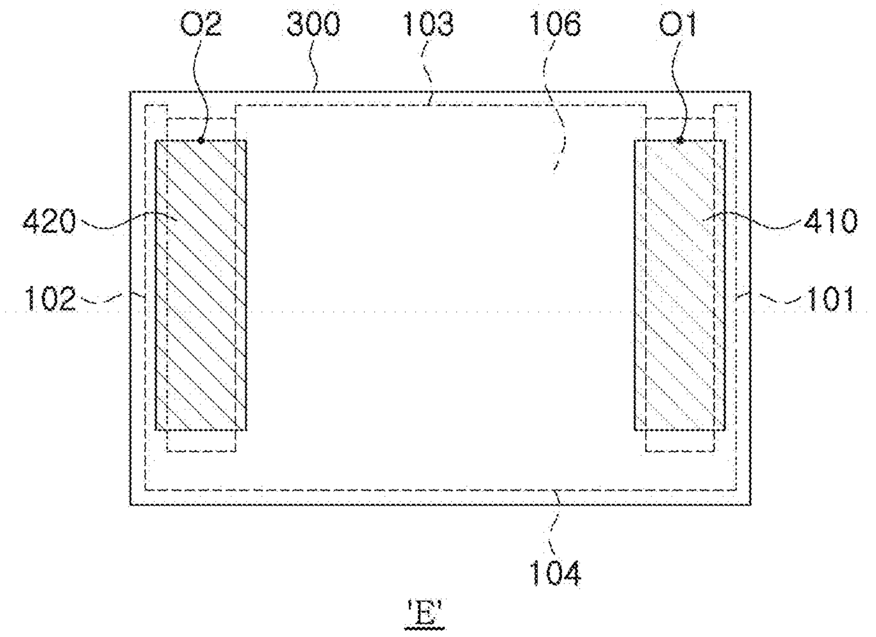
FIG. 8 is a view schematically illustrating the coil component based on a direction E of FIG. 7.
Figure 9:
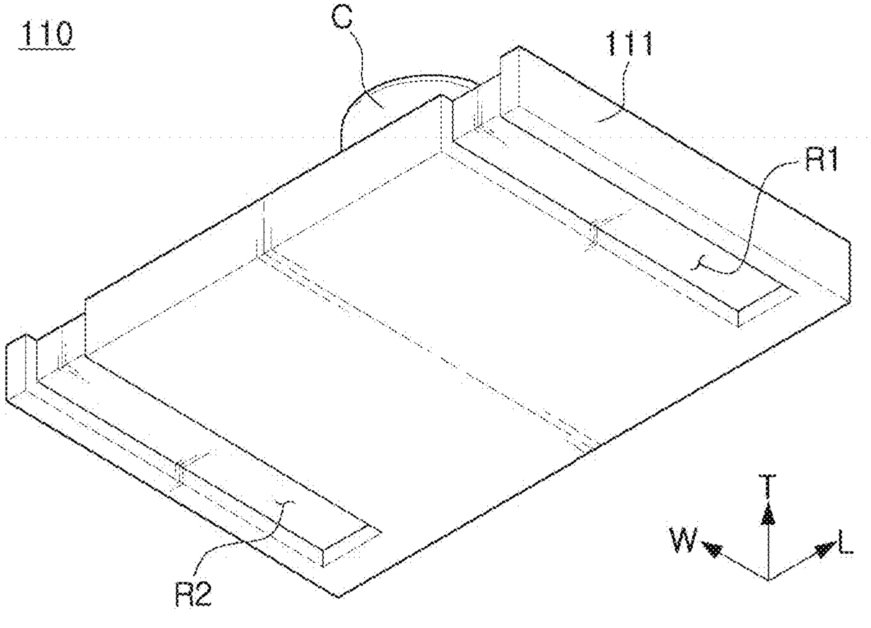
FIG. 9 is a view schematically illustrating a mold portion applied to the coil component shown in FIG. 7.
Figure 10:
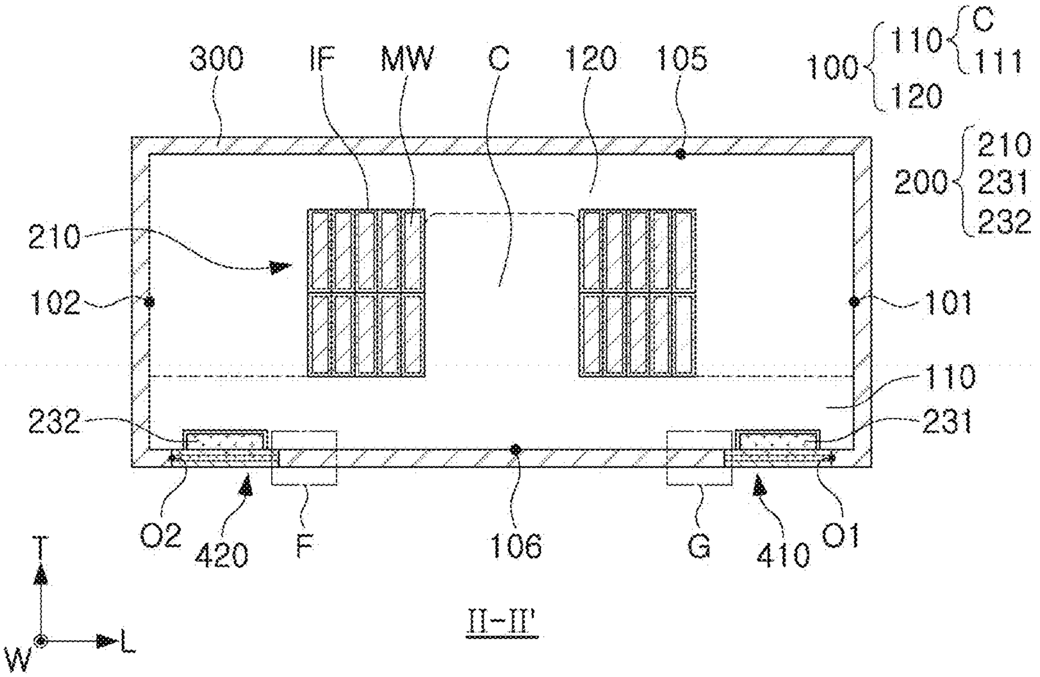
FIG. 10 is a view schematically illustrating a cross section of the coil component, taken along line II-II' of FIG. 7.
Figure 11:
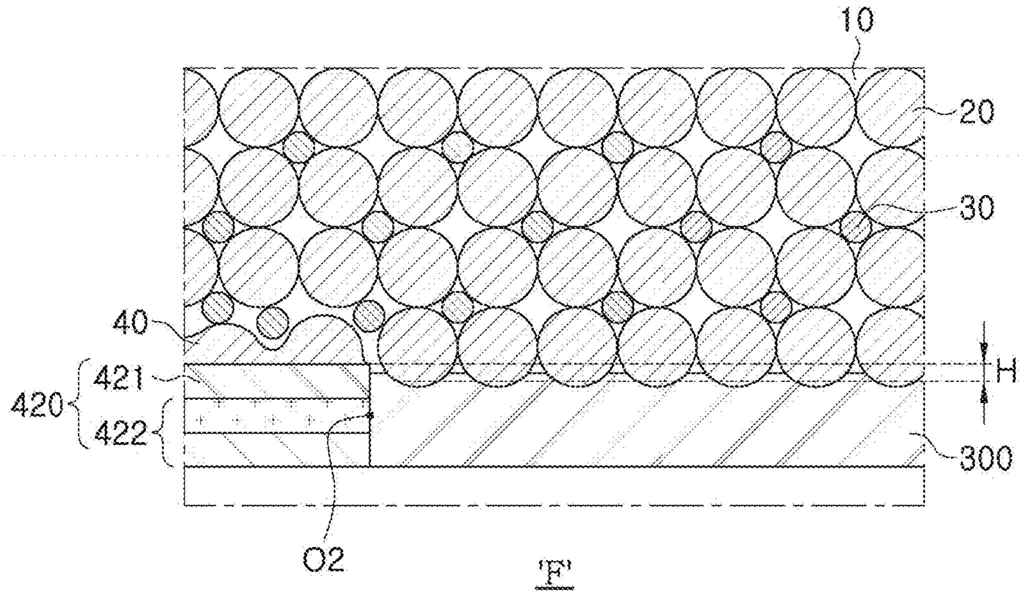
FIG. 11 is an enlarged view schematically illustrating a region F of FIG. 10.
Figure 12:
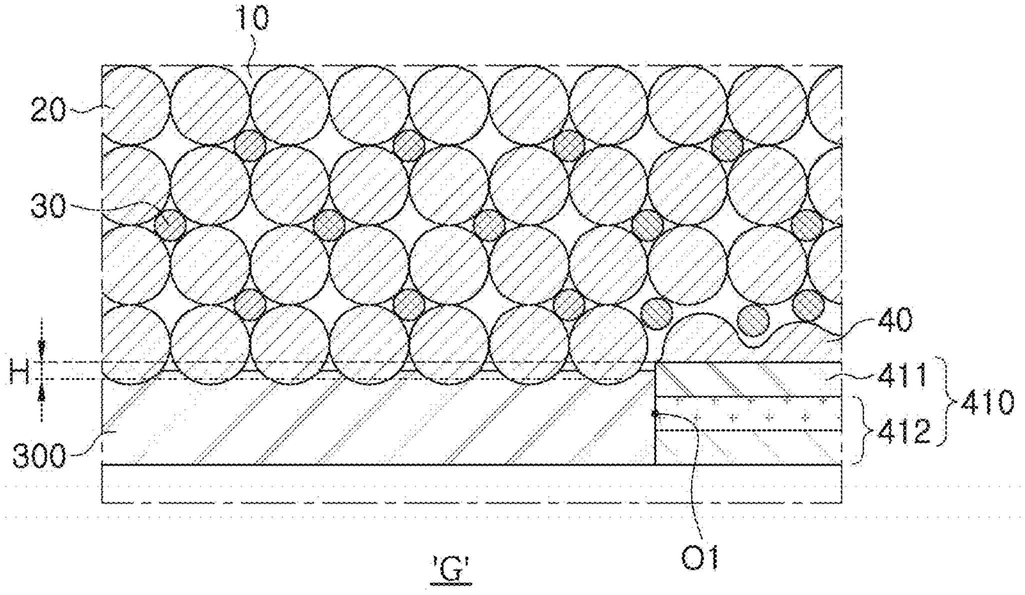
FIG. 12 is an enlarged view schematically illustrating a region G of FIG. 10.

FIG. 7 is a view schematically illustrating a coil component according to another exemplary embodiment of the present disclosure. FIG. 8 is a view schematically illustrating the coil component based on a direction E of FIG. 7. FIG. 9 is a view schematically illustrating a mold portion applied to the coil component shown in FIG. 7. FIG. 10 is a view schematically illustrating a cross section of the coil component, taken along line II-II' of FIG. 7. FIG. 11 is an enlarged view schematically illustrating a region F of FIG. 10. and FIG. 12 is an enlarged view schematically illustrating a region G of FIG. 10.

When comparing FIGS. 1 through 4 and FIGS. 7 through 10 each other, it may be seen that when compared to the coil component 1000 according to an exemplary embodiment of the present disclosure, a coil component 2000 according to this exemplary embodiment has a different structure of the body 100, a different surface of the body 100, to which the lead-out portions 231 and 232 are exposed, and different positions of the opening O1 or O2 and the external electrode due to these differences. Therefore, when describing this exemplary embodiment, the description only describes the body 100 and the lead-out portions 231 and 232, which are different from those in the coil component 1000 according to an exemplary embodiment of the present disclosure. For the other components of this exemplary embodiment, the description for those in an exemplary embodiment of the present disclosure may be applied as it is.

The body 100 applied to the coil component 2000 according to this exemplary embodiment may include a mold portion 110 and a cover portion 120. Side surfaces of the mold portion 110 and cover portion 120 may be the first to fifth surfaces 101, 102, 103, 104 and 105 of the body 100, and the other surface of the mold portion 110 (or lower surface of the mold portion 110 in a direction of FIGS. 8 through 10) may be the sixth surface 106 of the body 100. Hereinafter, the other surface of the mold portion 110 and the sixth surface of the body 100 indicate the same surface.

The mold portion 110 may have a support portion 111 having one surface and the other surface opposing each other, and a core C protruding from the one surface of the support portion 111. The support portion 111 may support the coil portion 200 disposed on the one surface of the support portion 111. The core C may protrude from the one surface of the support portion 111. The core C may be disposed at a center of the one surface of the support portion 111 to pass through the coil portion 200.

Referring to FIG. 9, groove portions R1 and R2, in which the lead-out portions 231 and 232 extended from both ends of the wound portion 210 are respectively disposed, may be formed in the other surface of the support portion 111, and one side surface of the support portion 111 connecting the one surface and the other surface to each other. The groove portion R1 or R2 may have a shape corresponding to that of the lead-out portion 231 or 232. Meanwhile, the groove portion R1 or R2 may be formed in a process of forming the mold portion 110 by using a mold or may be formed in the mold portion 110 in a process of compressing the cover portion 120. For another example, the lead-out portion 231 or 232 may pass through the mold portion 110 to be exposed to the other surface of the mold portion 110.

For example, the mold portion 110 may be formed using the mold having an inner space corresponding to the shapes of the support portion 111 and the core C. The mold portion 110 may be formed by filling the mold with a composite material including the magnetic metal powder particles and the insulating resin. The magnetic metal powder particles of the composite material may be the magnetic metal particles 20 and 30 of this exemplary embodiment. It is possible to further perform a process of applying high temperature and high pressure to the composite material in the mold, and the present disclosure is not limited thereto. The support portion 111 and the core C may be integrally formed with each other by the process using the above-described mold to have no boundary formed therebetween.

The cover portion 120 may be disposed over the one surface of the mold portion 110 to cover the coil portion 200. The cover portion 120 may be formed by disposing the magnetic composite sheet, in which magnetic metal powder particles are dispersed in the insulating resin, on each of the mold portion 110 and the coil portion 200, and then heating and compressing the same. In the above process, the mold portion 110 and the cover portion 120 may be integrated with each other so that a boundary therebetween is not distinguished without a separate processing, and the scope of the present disclosure is not limited thereto.

Figure 13:
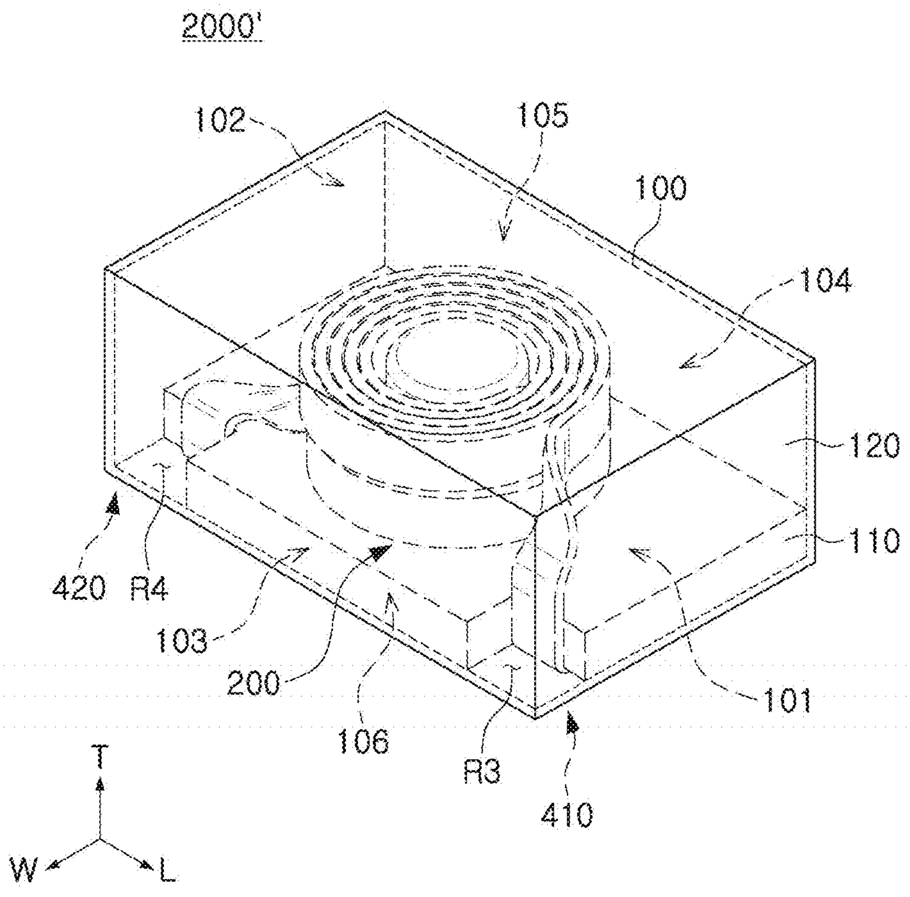
FIG. 13 is a view schematically illustrating a modified example of a coil component according to another exemplary embodiment of the present disclosure.

Unlike in an exemplary embodiment of the present disclosure, the first and second lead-out portions 231 and 232 applied to this exemplary embodiment may be exposed together to the sixth surface 106 of the body 100. That is, the first and second lead-out portions 231 and 232 may be disposed in the groove portions R1 and R2 of the mold portion 110, and exposed to the sixth surface 106 of the body 100, while being spaced apart from each other. Meanwhile, as in another coil component 2000' according to a modified example of FIG. 13, groove portions R3 and R4 may respectively be formed in corners of the mold portion 110 and the first and second lead-out portions 231 and 232 may respectively be bent to the lower surface of the mold portion 110 through the groove portions R3 and R4. The other components except for the shape of the groove portions R3 or R4 are similar to those in the exemplary embodiment of FIG. 7, and the descriptions of the exemplary embodiment of FIG. 7 may thus also be applied to the exemplary embodiment of FIG. 13.

The surface insulation layer 300 may cover the first to sixth surfaces 101, 102, 103, 104, 105 and 106 of the body 100, and the openings O1 and O2 exposing the first and second lead-out portions 231 and 232 exposed to the sixth surface 106 of the body 100 may be formed in the surface insulation layer 300. As shown in FIGS. 8 and 10, a dimension of each of the openings O1 and O2 in the length (L) direction may be greater than a dimension of each of the lead-out portions 231 and 232 in the length (L) direction. Accordingly, each of the openings O1 and O2 may further expose at least a portion of the sixth surface 106 of the body 100 as well as the lead-out portions 231 and 232.

The external electrodes 410 and 420 may be disposed only on the sixth surface 106 of the body 100. The external electrodes 410 and 420 may be disposed on the sixth surface 106 of the body 100, while being spaced apart from each other. The first external electrode 410 may be disposed in the first opening O1 to be in contact with the first lead-out portion 231, and the second external electrode 420 may be disposed in the second opening O2 to be in contact with the second lead-out portion 232.

Meanwhile, as shown in FIGS. 11 and 12, the connection metal layer 40 described in an exemplary embodiment of the present disclosure may also be formed in this exemplary embodiment, and the description of the connection metal layer 40 described above may also be equally applied to this exemplary embodiment.

Figure 14:
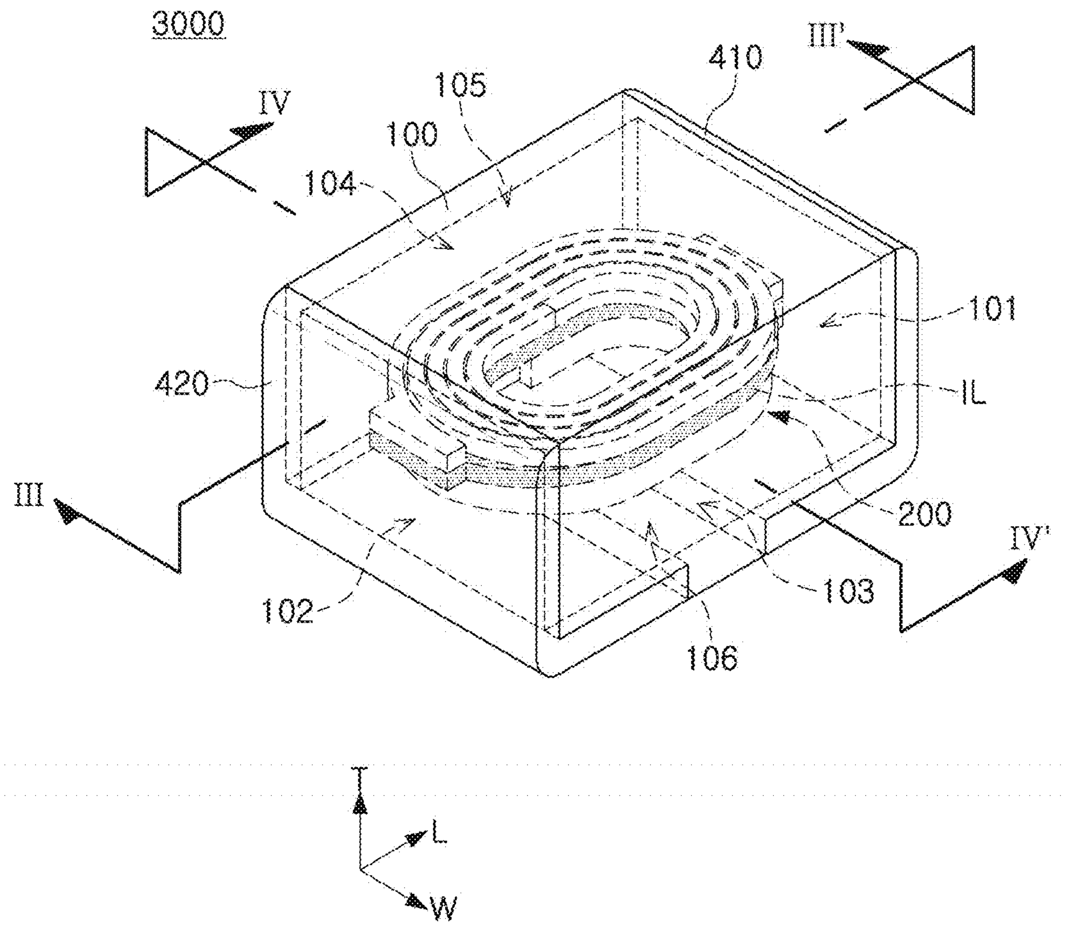
FIG. 14 is a view schematically illustrating a coil component according to still another exemplary embodiment of the present disclosure.
Figure 15:
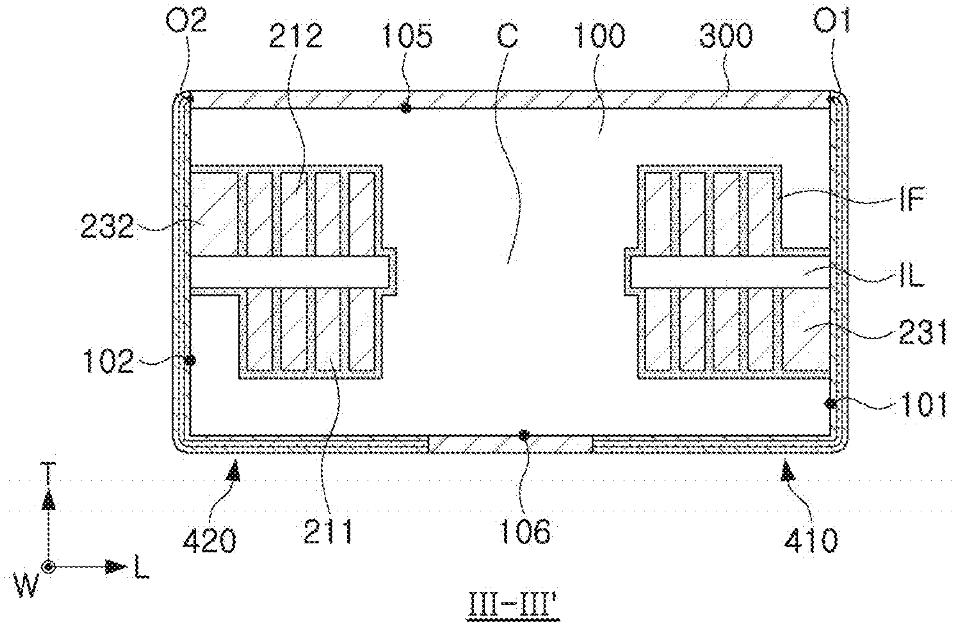
FIG. 15 is a view schematically illustrating a cross section of the coil component, taken along line III-III' of FIG. 14.
Figure 16:
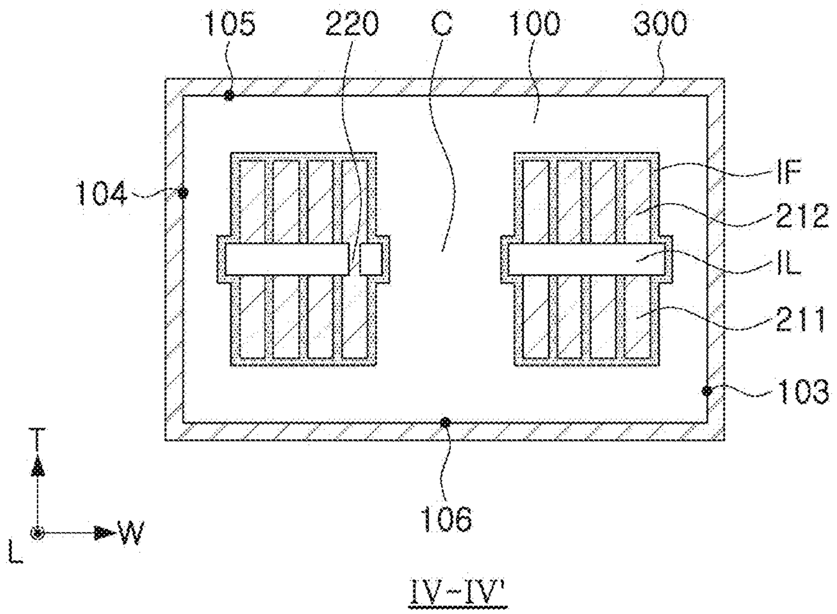
FIG. 16 is a view schematically illustrating a cross section of the coil component, taken along line IV-IV' of FIG. 14.

FIG. 14 is a view schematically illustrating a coil component according to still another exemplary embodiment of the present disclosure; FIG. 15 is a view schematically illustrating a cross section of the coil component, taken along line III-III' of FIG. 14; and FIG. 16 is a view schematically illustrating a cross section of the coil component, taken along line IV-IV' of FIG. 14.

When comparing FIGS. 1 through 4 and FIGS. 14 through 16 each other, it may be seen that when compared to the coil component 1000 according to an exemplary embodiment of the present disclosure, a coil component 3000 according to this exemplary embodiment includes the different coil portion 200 and further includes a board IL. Therefore, when describing this exemplary embodiment, the description only describes the coil portion 200 and the board IL, which are different from those in the coil component 1000 according to an exemplary embodiment of the present disclosure. For the other components of this exemplary embodiment, the description for those in an exemplary embodiment of the present disclosure may be applied as it is.

The board IL may be disposed within the body 100. The board IL may support the coil portion 200. The board IL may be formed of an insulating material including at least one of a thermosetting insulating resin such as an epoxy resin, a thermoplastic insulating resin such as polyimide and a photosensitive insulating resin. Alternatively, the board IL may be formed of an insulating material in which at least one resin is impregnated with a reinforcing material such as a glass fiber or an inorganic filler. For example, the board IL may be formed of an insulating material such as a copper clad laminate (CCL), an unclad CCL which is an insulating material from which copper foil is removed from the copper clad laminate, prepreg, an Ajinomoto build-up film (ABF), FR-4, a bismaleimide triazine (BT) film or a photo imagable dielectric (PID), and is not limited thereto.

The inorganic filler may use one or more materials selected from the group consisting of silica (or silicon dioxide, $SiO_2$), alumina (or aluminum oxide, $Al_2O_3$), silicon carbide (SiC), barium sulfate ($BaSO_4$), talc, clay, mica powder particles, aluminum hydroxide ($AlOH_3$), magnesium hydroxide ($Mg(OH)_2$), calcium carbonate ($CaCO_3$), magnesium carbonate ($MgCO_3$), magnesium oxide (MgO), boron nitride (BN), aluminum borate ($AlBO_3$), barium titanate ($BaTiO_3$) and calcium zirconate ($CaZrO_3$).

When the board IL is formed of the insulating material including the reinforcing material, the board IL may provide more excellent rigidity. The board IL may be formed of the insulating material not including the glass fiber, which may be advantageous because the coil portion 200 may have an increased volume in the body 100 having the same size. When the board IL is formed of the insulating material including the photosensitive insulating resin, it is possible to reduce the number of processes of forming the coil portion 200, which may be advantageous in reducing a production cost, and forming a fine via.

The coil portion 200 may include coil patterns 211 and 212, the lead-out portions 231 and 232 and a via 220. In detail, the first coil pattern 211 and the first lead-out portion 231 may be disposed on a lower surface of the board IL, facing the sixth surface 106 of the body 100, and the second coil pattern 212 and the second lead-out portion 232 may be disposed on an upper surface of the board IL facing the lower surface of the board IL, based on a direction of FIGS. 15 and 16. The first coil pattern 211, disposed on the lower surface of the board IL, may be contact-connected to the first lead-out portion 231. The second coil pattern 212 disposed on the upper surface of the board IL may be contact-connected to the second lead-out portion 232, and the via 220 may pass through the board IL to be contact-connected to an inner end of each of the first coil pattern 211 and the second coil pattern 212. In this manner, the coil portion 200 may entirely function as one coil.

Each of the first coil pattern 211 and the second coil pattern 212 may have a shape of a flat spiral having at least one turn formed by using the core C as an axis. For example, the first coil pattern 211 may form at least one turn on the lower surface of the board IL by using the core C as the axis.

The lead-out portions 231 and 232 may respectively be exposed to the first and second surfaces 101 and 102 of the body 100. That is, the first lead-out portion 231 may be exposed to the first surface 101 of the body 100, and the second lead-out portion 232 may be exposed to the second surface 102 of the body 100.

At least one of the coil patterns 211 and 212, the via 220 and the lead-out portions 231 and 232 may include at least one conductive layer. For example, when the second coil pattern 212, the via 220 and the second lead-out portion 232 are formed on the upper surface of the board IL by plating, based on the direction of FIGS. 15 and 16, each of the second coil pattern 212, the via 220 and the second lead-out portion 232 may include a seed layer such as an electroless plating layer and electroplating layer. Here, the electroplating layer may have a monolayer or multilayer structure. The electroplating layer having the multilayer structure may be a conformal film in which another electroplating layer covers one electroplating layer, or may be a layer in which another electroplating layer is stacked on only one surface of one electroplating layer. The seed layer of the second coil pattern 212, the seed layer of the via 220 and the seed layer of the second lead-out portion 232 may be integrally formed with one another to have no boundary formed therebetween, and are not limited thereto. The electroplating layer of the second coil pattern 212, the electroplating layer of the via 220 and the electroplating layer of the second lead-out portion 232 may be integrally formed with one another to have no boundary formed therebetween, and are not limited thereto.

Each of the coil patterns 211 and 212, the via 220 and the lead-out portions 231 and 232 may be formed of a conductive material such as copper (Cu), aluminum (Al), silver (Ag), tin (Sn), gold (Au), nickel (Ni), lead (Pb), titanium (Ti), chromium (Cr), molybdenum (Mo) or an alloy thereof, and is not limited thereto. For example, the first coil pattern 211 may include a seed layer in contact with the board IL and including copper (Cu), and an electroplating layer disposed on the seed layer and including copper (Cu), and the scope of the present disclosure is not limited thereto.

An insulating film IF may be disposed between the coil portion 200 and the body 100. The insulating film IF may be formed by using at least one of a vapor deposition method and a film lamination method. Meanwhile, the insulating film IF formed by using the latter method may be a permanent resist in which a plating resist used in plating the coil portion 200 on the board IL remains in a final product, and is not limited thereto. The insulating film IF may include an insulating material such as parylene, epoxy or polyimide. The insulating film (IF) in this exemplary embodiment is unable to cover a lower surface of each turn of the coil portion 200, and thus different from the insulating film (IF) in an exemplary embodiment of the present disclosure described above.

As set forth above, the present disclosure may provide the coil component having the increased coupling force between the body and the external electrode.

The present disclosure may also provide the coil component without the reduction of the break down voltage (BDV).

While exemplary embodiments have been shown and described above, it will be apparent to those skilled in the art that modifications and variations could be made without departing from the scope of the present disclosure as defined by the appended claims.

What is claimed is:

1. A coil component comprising:

a body including magnetic metal particles and an insulating resin;

a coil portion disposed within the body and including a lead-out portion exposed to one surface of the body;

a surface insulation layer disposed on the body and having an opening exposing at least a portion of the lead-out portion and at least a portion of the one surface of the body; and an external electrode disposed in the opening and connected to the lead-out portion, wherein the body includes a connection metal layer in a region of the body adjacent to the one surface of the body, wherein the connection metal layer includes a connection metal layer particle in which at least some of the magnetic metal particles are connected to each other, an area ratio of a metal component including the connection metal layer particles in the region is 75% or more of an area of the region, the magnetic metal particles include a first magnetic metal particle and a second magnetic metal particle having a smaller diameter than the first magnetic metal particle, a diameter of the connection metal layer particle is twice or more than a diameter of the first magnetic metal particle, and an average particle diameter of the first and second magnetic metal particles are in a range from 0.1 μm to 30 μm.

2. The coil component of claim 1, wherein the one surface of the body has a level indented inwardly than a region of the body covered by the surface insulation layer.

3. The coil component of claim 1, further comprising a board which is placed within the body and on at least one surface of which the coil portion is disposed.

4. The coil component of claim 3, further comprising an insulating film disposed between the coil portion and the body.

5. The coil component of claim 1, wherein the coil portion is a wound coil.

6. The coil component of claim 1, wherein the external electrode is in contact with each of the connection metal layer and the lead-out portion.

7. The coil component of claim 6, wherein the lead-out portion includes a first lead-out portion exposed to the one surface of the body, and a second lead-out portion exposed to other surface of the body opposing the one surface, the opening includes a first opening exposing each of one region of the one surface of the body and the first lead-out portion, and a second opening exposing each of one region of the other surface of the body and the second lead-out portion, the connection metal layer is formed in each of the one region of the one surface of the body and the one region of the other surface of the body, and the external electrode includes a first external electrode disposed in the first opening and in contact with the first lead-out portion, and a second external electrode disposed in the second opening and in contact with the second lead-out portion.

8. The coil component of claim 7, wherein the first and second openings are respectively extended to a connection surface of the body, connecting the one surface and the other surface of the body to each other, and spaced apart from each other in the connection surface of the body.

9. The coil component of claim 6, wherein the lead-out portion includes first and second lead-out portions exposed to the one surface of the body, while being spaced apart from each other, the opening includes a first opening exposing one region of the one surface of the body and a first lead-out portion, and a second opening exposing another region of the one surface of the body and a second lead-out portion, the connection metal layer is formed in each of the one region and the another region of the one surface of the body, and the external electrode includes a first external electrode disposed in the first opening and in contact with the first lead-out portion, and a second external electrode disposed in the second opening and in contact with the second lead-out portion.

10. The coil component of claim 6, wherein the external electrode has a first electrode layer in contact with each of the connection metal layer and the lead-out portion, and a second electrode layer disposed on the first electrode layer.

11. The coil component of claim 10, wherein the first electrode layer comprises copper (Cu).

12. A coil component comprising:

a body including: a first magnetic particles; a second magnetic particles having a smaller diameter than a diameter of the first magnetic metal particle; and an insulating resin;

a coil portion disposed within the body and including a lead-out portion exposed to one surface of the body;

a surface insulation layer disposed on the body and having an opening exposing at least a portion of the lead-out portion and at least a portion of the one surface of the body; and an external electrode disposed in the opening and connected to the lead-out portion, wherein the body includes a connection metal layer in a region of the body adjacent to the one surface of the body, the connection metal layer includes a connection metal layer particle having a diameter that is twice or more than the diameter of the first magnetic metal particle, and an average particle diameter of the first and second magnetic metal particles are in a range from 0.1 μm to 30 μm.

13. The coil component of claim 12, wherein an area of a metal component in a region of the connection metal layer is 75% or more of an entire area of the region.

14. The coil component of claim 12, wherein the one surface of the body has a level indented inwardly than a region of the body covered by the surface insulation layer.

15. The coil component of claim 12, wherein the external electrode is in contact with each of the connection metal layer and the lead-out portion.

* * * * *